J. A. BUTTERWORTH.
HOISTING MACHINE.
APPLICATION FILED SEPT. 26, 1914.
1,183,429.
Patented May 16, 1916.
3 SHEETS—SHEET 2.
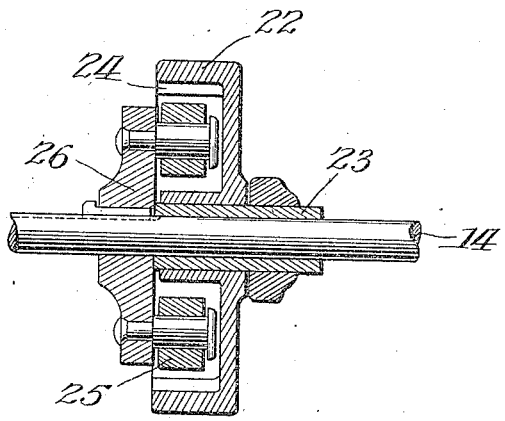
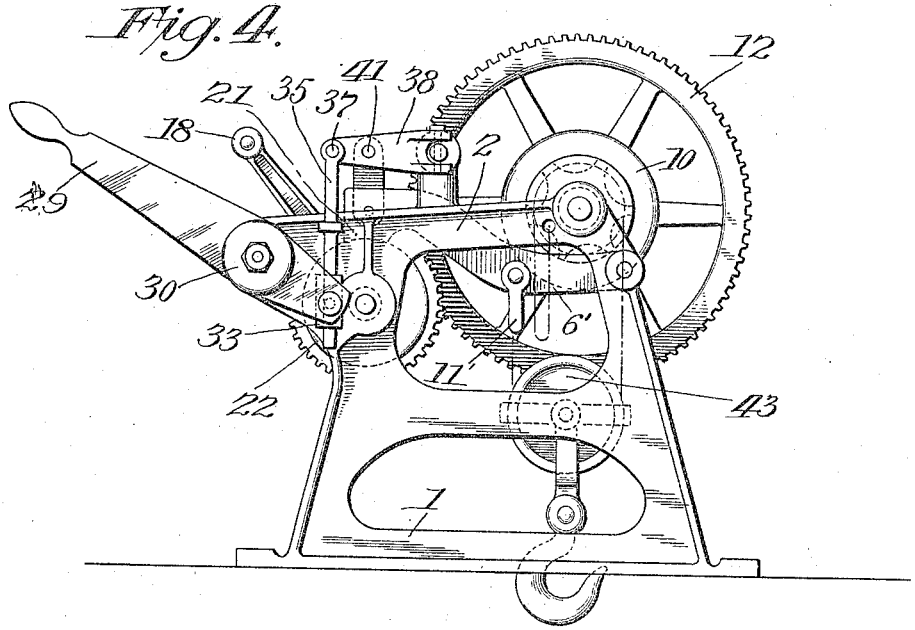

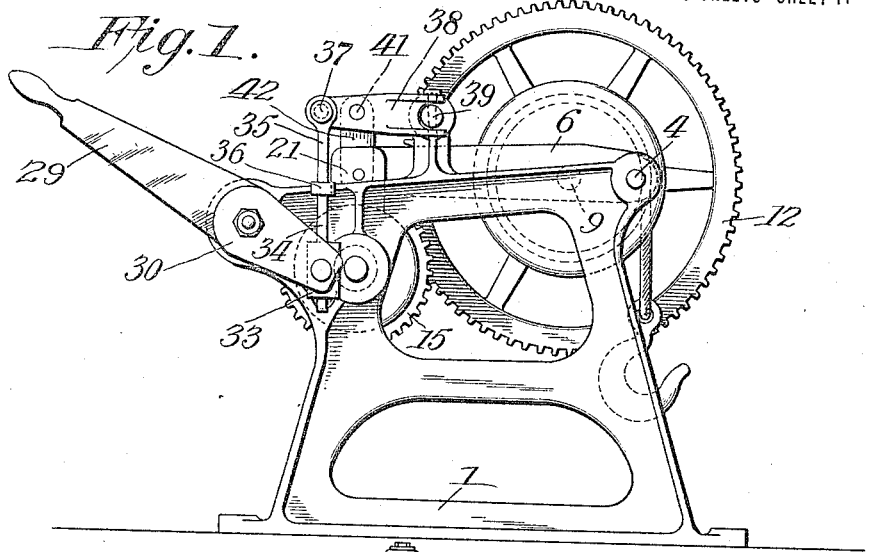

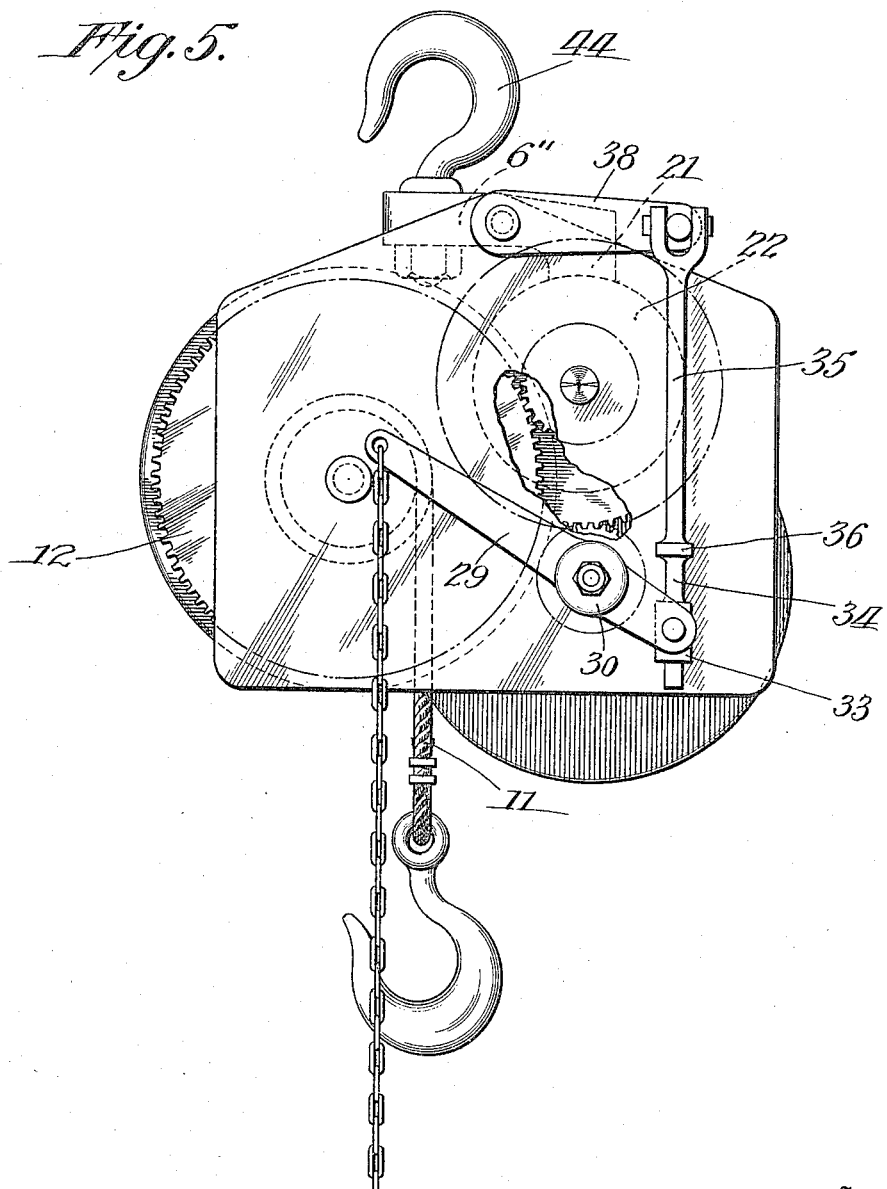

UNITED STATES PATENT OFFICE.

JOSEPH ALEXANDER BUTTERWORTH, OF LOUGHBOROUGH, ENGLAND, ASSIGNOR TO HERBERT MORRIS, LIMITED, OF LOUGHBOROUGH, ENGLAND.

HOISTING-MACHINE.

1,183,429. Specification of Letters Patent. Patented May 16, 1916.

Application filed September 26, 1914. Serial No. 863,623.

*To all whom it may concern:*

Be it known that I, JOSEPH ALEXANDER BUTTERWORTH, a subject of the King of Great Britain, residing at Loughborough, in the county of Leicester, England, have invented certain new and useful Improvements in Hoisting-Machines, of which the following is a specification.

This invention relates to hoisting-machines, and particularly to that class of machines in which the load is suspended by a rope wound around a drum, or a chain passing over a sprocket, the drum or sprocket being turned in the hoisting or lowering direction by a handle, wheel, or other means geared or otherwise connected to the drum or sprocket.

It is desirable in this class of machines to provide: First, that the load shall be efficiently sustained when hoisted, and yet be capable of being readily lowered by the operating means; second, that it shall be possible, when required, to lower the load rapidly under the influence of gravity; third, that during such rapid lowering the operating means shall remain stationary; and fourth, that the pull required on the rope or chain to bring the load down shall be as small as possible, so as to permit the rapid descent of light loads.

The object of the present invention is the provision of a hoisting-machine having the foregoing qualifications.

An embodiment of the invention is illustrated in the accompanying drawings, in which,—

Figure 1 is a side elevation of a spur-gear winch, to which the invention is applied; Fig. 2 is a plan view of the machine, some of the parts being shown in section; Fig. 3 is a sectional view of the brake-drum, and the ratchet-and-pawl construction for preventing rotation of the drum in one direction; and Figs. 4 and 5 are side elevations of other types of machines having the invention applied thereto.

As illustrated in Figs. 1 and 2, the machine has a suitable supporting-frame 1, near the top of which are pivoted to its sides 2, 3, at the points 4, 5, arms or levers 6 and 7, the free ends of these levers being joined by a suitable connecting-rod 8. Journaled in the levers 6 and 7, somewhat nearer the pivoted ends than the free ends, is the spindle 9 of the revoluble drum 10, around which winds the load-carrying rope or chain 11. The drum 10 is provided with a large spur-gear 12 which rotates therewith, and which is arranged to mesh with a smaller spur-gear 13 secured to a shaft 14, which shaft lies parallel to the axis of the drum 10 and which is suitably journaled at its ends in the sides 2 and 3 of the supporting-frame 1. A second spur-gear 15 is also mounted upon the shaft 14, and this gear is adapted to mesh with a smaller spur-gear 16 secured to and rotatable with a shaft 17. The shaft 17 is releasably connected, through a suitable clutch, with a handle 18, or any other operating means, one member 19 of the clutch being secured to one end of the shaft 17, and the other clutch-member 20 being formed with or connected to the operating means, and arranged to turn on a suitable journal-sleeve 17' stationarily mounted about the shaft 17. Disengagement of the clutch-members is effected by axial movement of the shaft 17.

Depending from the connecting-rod 8 of the drum-supporting levers 6 and 7 is a brake-shoe 21, the lower curved surface of which is adapted to rest upon the periphery of a frictional brake-drum 22 (Fig. 3), fixedly mounted on a sleeve 23 about the shaft 14. The interior face of the brake-drum 22 is provided with ratchet-teeth 24, and to prevent the turning of the drum when the operating means is being revolved in the hoisting direction, pawls 25 pivoted to a carrier-yoke 26 are arranged on the interior of the drum in position to engage the ratchet-teeth 24. The pawl-carrier 26 is keyed or otherwise secured on the shaft 14, and consequently rotates therewith.

The end of the shaft 17 remote from the clutch is journaled in a sleeve 27, secured by screws or other means to the side 2 of the supporting-frame 1, and the outer end 28 of this sleeve is threaded. Near the end of the shaft 17 is provided a releasing-lever 29, having a collar 30. This collar 30 is internally threaded to engage the threads 28 of the sleeve 27, and its outermost end is apertured in such manner as to fit about a reduced or recessed portion 32 of the shaft 17. It will be seen that upon moving the lever 29 up or down, the shaft 17 will be moved axially, accordingly. At the end of the lever 29 remote from the handle is a swivel-piece 33 encircling and sliding along the stem 34 of a link 35. On the link 35 there is fixed a collar 36, against which the swivel-piece 33 strikes during the downward movement of the lever 29. The upper end of the link 35 is pivoted at 37 to an arm 38, the latter being secured to one end of and adapted to turn a short-shaft 39 rotatably mounted in a bearing formed in an extension of the side 2 of the supporting-frame. To the other end of the short-shaft 39 is fixed an arm 40, the outer end of which is pivoted at 41, through a vertical extension 42, to brake-shoe 21. It will be seen that as the short-shaft 39 is oscillated, the brake-shoe 21 will be raised from or lowered against the surface of the brake-drum 22.

The operation of the machine will be readily understood from the foregoing description. In hoisting, the operating means is turned in the usual manner, and, the clutch-members 19 and 20 being in engagement, the shaft 17 will turn carrying with it the spur-gear 16. Spur-gear 15 and its shaft 14 will be therefore revolved, and the spur-gear 13 will turn the spur-wheel 12 of the load-carrying drum 10. During this movement of the parts, the brake-drum 22 is held stationary, on account of the pressure of the brake-shoe 21 upon its periphery, and the pawls 25 are permitted to turn with the pawl-carrier 26 and the shaft 14. The load will be maintained in its hoisted position by the frictional engagement of the brake-shoe 21 with the drum 22, the tendency of the shaft 14 to turn in the opposite and lowering direction serving to lock the pawls 25 in engagement with the teeth 24 of the brake-drum 22.

To lower the load by hand, the operating means 18 is turned in the lowering direction, when the brake-drum 22 is caused through the medium of the pawls 25 to turn with the shaft 14. Such turning is effected against the resistance due to the brake-shoe 21 pressing on the brake-drum 22; but the system of supporting-levers 6 and 7 is so proportioned and arranged as to require but a reasonably small effort at the handle, for lowering.

To lower the load by gravity, the lever 29 is pushed downward, such movement serving first to cause an axial displacement of the shaft 17 to disengage the clutch-members 19 and 20. The operating means will now remain stationary although the shaft 17 is rotated. When the lever 29 has been moved downward sufficiently to disengage the clutch, the swivel-piece 33 strikes the collar 36 on the stem 34, so that further movement of the lever 29 causes the lever 38 to move upward thereby turning the short-shaft 39. Arm 40 is thus tilted upward and lifts the brake-shoe 21 from the brake-drum 22. The load carried by the rope 11 will now be free to descend, since the pressure due to the sustaining-brake is relieved. When the lever 29 is released, the weight of the drum 10 combined with the load will cause the brake-shoe 21 to again assume its position in frictional engagement with the brake-drum 22. To reëngage the clutch-members 19 and 20, the lever 29 is further moved into its upper position.

In the application of this invention, the necessary pressure on the brake-drum may be obtained from any suitable member of the machine on which there is a pull or pressure induced by or proportional to the load. For example, in the chain-winch illustrated in Fig. 4, the load is suspended by a snatch-block 43, and the stationary chain 11' is attached to the lever 6' forming portion of a frame somewhat similar to that described in connection with Figs. 1 and 2. In such construction, however, the load-supporting drum can be journaled directly in the sides of the supporting-frame 1. The brake-shoe 21 is caused to press on the brake-drum 22, as before, and the other details of construction and operation are the same.

In Fig. 5, the invention is shown as applied to a pulley-block, in which the pull in the upper hook 44 is employed to cause, through the lever 6'', a downward pressure through the brake-shoe 21 on the brake-drum 22. Here again the details of construction and the method of operation are essentially the same as described in connection with Figs. 1 and 2.

I claim:—

1. In a hoisting-machine, a revoluble load-supporting member, a shaft mounted to revolve with said member, operating means, a clutch-connection between said load-supporting member and said operating means, a brake-drum on said shaft, a brake-shoe arranged to frictionally engage the periphery of said brake-drum, a lever carrying the brake-shoe, means for applying the pull of the load to said lever, means for causing the rotation of the brake-drum in the lowering direction only, means for disengaging the clutch, and means for relieving the pressure of said brake-shoe on the brake-drum.

2. In a hoisting-machine, a revoluble load-supporting member, operating means, a shaft adapted to transmit motion from the operating means to said load-supporting member, a journal-sleeve on said shaft, a brake-drum on said sleeve, means for causing the rotation of the brake-drum in the lowering direction only, a brake-shoe arranged to frictionally engage the periphery of said brake-drum, a lever carrying the brake-shoe, means for applying the pull of the load to said lever, and means for disengaging said brake-shoe from the brake-drum to permit the load to descend by gravity.

3. In a hoisting-machine, a revoluble load-supporting member, a shaft mounted to revolve with said member, operating means, a clutch-connection between said load-supporting member and said operating means through said shaft, a brake-drum on said shaft, a brake-shoe arranged to frictionally engage the periphery of said brake-drum, a lever carrying the brake-shoe, means for applying the pull of the load to said lever, means for causing the rotation of the brake-drum in the lowering direction only, and single means for first disengaging the clutch and then relieving the pressure of said brake-shoe on the brake-drum.

4. In a hoisting-machine, a revoluble load-supporting member, a shaft mounted to revolve with said member, operating means, a clutch-connection between said load-supporting member and said operating means, one member of said clutch being connected to the operating means and the other member to said shaft, an intermediate shaft arranged to transmit motion from the first shaft to the load-supporting member, a brake-drum on said intermediate shaft, a brake-shoe arranged to frictionally engage the periphery of said brake-drum, a lever carrying the brake-shoe, means for applying the pull of the load to said lever, means for causing the rotation of the brake-drum in the lowering direction only, and single means for first disengaging said clutch members and then relieving the pressure of said brake-shoe on the brake-drum.

5. In a hoisting-machine, a revoluble load-supporting member, operating means, a shaft adapted to transmit motion from the operating means to said load-supporting member, a clutch connecting said operating means and said shaft, a journal-sleeve on said shaft, a brake-drum on said sleeve, means for causing the rotation of the brake-drum in the lowering direction only, a brake-shoe arranged to frictionally engage the periphery of said brake-drum, a lever carrying the brake-shoe, means for applying the pull of the load to said lever, and means for first disengaging said clutch and then disengaging the brake-shoe from said brake-drum, to permit the load to descend by gravity.

6. In a hoisting-machine, a revoluble load-supporting member, a shaft, a train of gears connecting said load-supporting member and said shaft, operating means, a clutch, one member of said clutch being connected to the operating means and the other member to said shaft, an intermediate shaft carrying gears of said train, a journal-sleeve stationarily mounted about said intermediate shaft, a brake-drum on said sleeve having ratchet-teeth, pawls adapted to revolve with said intermediate shaft and to engage said ratchet-teeth only when said operating means is turned in the lowering direction, a brake-shoe arranged to frictionally engage the periphery of said brake-drum, a lever carrying the brake-shoe, means for applying the pull of the load to said lever, means for disengaging said clutch-members, and means for relieving the pressure of said brake-shoe on the brake-drum.

7. In a hoisting-machine, a supporting-frame having two upright sides, a pair of levers each of which is pivoted at one of its ends to one of said sides, a load-supporting drum having journals in said levers between their ends, a shaft, a train of gears connecting said load-supporting drum and said shaft, operating means, a clutch-connection between said load-supporting drum and said operating means, one member of said clutch being connected to the operating means and the other member to said shaft, an intermediate shaft carrying gears of said train, a brake-drum on said intermediate shaft, a cross-rod connecting the free ends of said levers, a brake-shoe carried by said rod and arranged to frictionally engage the periphery of said brake-drum, means for causing the rotation of the brake-drum in the lowering direction only, and single means for first disengaging the clutch and then disengaging said brake-shoe from said drum.

8. In a hoisting-machine, a supporting-frame having upright sides, a pair of levers each of which is pivoted at one of its ends to one of said sides, a load-supporting drum having journals in said levers between their ends, a cross-rod connecting the free ends of said levers, operating means for revolving said load-supporting member, a shaft arranged to transmit motion from the operating means to said load-supporting member, a journal-sleeve on said shaft, a brake-drum on said sleeve, a brake-shoe secured to said cross-rod and adapted to frictionally engage the periphery of said brake-drum, and means for raising said brake-shoe from the brake-drum.

9. In a hoisting-machine, a revoluble load-supporting member, a shaft adapted to transmit motion to said load-supporting member, a stationary journal-sleeve on said shaft, a clutch-member on said shaft, operating means having a clutch-member revoluble about said sleeve, means for moving said shaft axially to disengage said clutch-members, a brake-drum arranged to revolve with said load-supporting member in the lowering direction only, a brake-shoe arranged to frictionally engage the periphery of said brake-drum, a lever carrying the brake-shoe, means for applying the pull of the load to said lever, and means for relieving said pressure after the disengagement of said clutch-members, when the load is permitted to descend by gravity.

In testimony whereof I affix my signature in presence of two witnesses.

JOSEPH ALEXANDER BUTTERWORTH.

Witnesses:
A. W. H. PARNELL,
R. SPRIGGS.